Aug. 23, 1966   KEIJ AZEGAMI   3,267,806
MIRROR HAVING A MAGNIFYING PORTION
Filed April 4, 1962
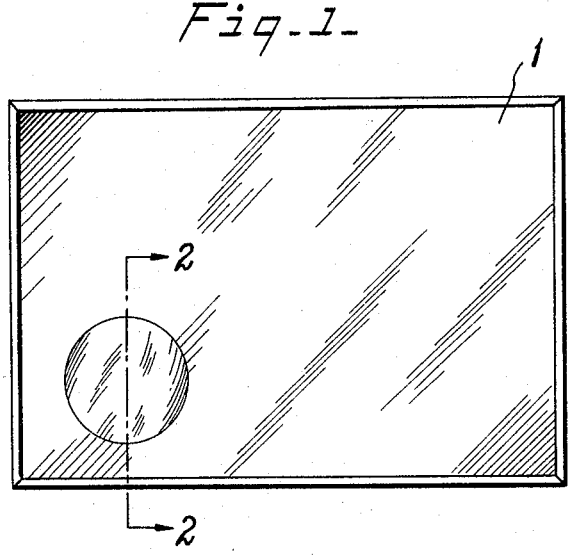
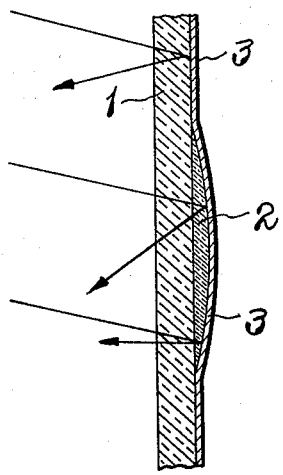

United States Patent Office 3,267,806
Patented August 23, 1966

3,267,806
MIRROR HAVING A MAGNIFYING PORTION
Keiji Azegami, 4592 Koshigaya, Koshigaya-shi,
Saitama-ken, Japan
Filed Apr. 4, 1962, Ser. No. 185,144
1 Claim. (Cl. 88—84)

This invention relates to a mirror for providing a magnified image on a local portion thereof. According to the invention an embodiment of the mirror comprises a transparent plano-convex lens of which the flat surface of which is adhered to a suitable portion of the back-side surface of a flat glass plate, while a reflective surface is formed on the whole back-side area of the thus assembled unit to form a reflective surface acting as a mirror layer. The purpose of this invention is to provide an inexpensive integral mirror with two parts, one of which reflects a nonmagnified image similar to that ordinarily used and the other part forms a locally magnified image suitable for shaving, applying make-up and the like.

It is known to form a concave portion on a suitable part of a glass surface of a flat mirror capable of providing a magnified image on this portion. Such mirror is very convenient since one can obtain a locally magnified image and a nonmagnified image in a single mirror. However, the formation of such concave portion on a part of a flat glass plate not only requires very difficult cutting and grinding techniques and consumes considerable time and labor, but also frequently causes breakage of the blank glass plate during the processing. Therefore it was impracticable to make such a mirror in commercial production at low cost.

An object of this invention is to provide mirrors having accurate magnified image portions of large magnifying power in mass production and cheaply in cost.

Another object of this invention is to provide a mirror which is made by adhering the flat surface of a transparent plano-convex lens onto a suitable part of the back side of a flat glass sheet, and forming a reflective surface, acting as a mirror layer, over the whole back-side area of the assembled unit. There is no need to use a blank glass sheet of large width since the blank glass sheet is not cut or ground to form a concave portion and therefore any sheet glass can be used as the blank flat glass sheet if such glass sheet is polished on its both surfaces. Accordingly, the mirror can be made light in weight and relatively cheap in cost.

The plano-convex lens can be made from glass or other suitable transparent synthetic resin such as polymethacrylate resin or polystyrene resin. Such resin materials can easily be shaped by simple pressing and polishing procedures. One side of the lens is flat and the other side convex of a suitable curvature, preferably of 50–100 cm. in radius.

In the accompanying drawings,

FIG. 1 is a plan view of a mirror according to the invention, and

FIG. 2 is an enlarged section taken along the lines 2—2 in FIG. 1.

In forming the mirror of this invention, a plano-convex lens 2 is adhered to a suitable portion of the back side of a glass sheet 1. An adhesive of synthetic resin or cellulose derivative, which is able to form a transparent layer, is used. Preferably an epoxy resin-type adhesive is utilized, and especially a mixture of epoxy resin and 6–10% polyamine hardening agent, such as a mixture of an epoxy resin "Bond E" and a hardening agent "Bond $A_2$"; "Epon 6"; and "Araldite," all of which are commercially distributed.

On a flat surface 2' of the plano-convex lens 2, the above mentioned adhesive is spread to form a film, then such coated surface is put on the back side of the flat glass sheet 1, and pressed thereagainst to eliminate any entrapped bubbles therebetween. The both surfaces will firmly be adhered to each other after being left in the pressed condition for a period of time. Thereafter a reflective layer 3 is formed on the whole back side of the assembled unit. The formation of such reflective layer can be performed by known method, such as by chemically depositing silver from a silver nitrate solution, or by vacuum evaporation of a metal such as aluminum, silicon, or tin.

In case the former chemical method is to be applied, the flat glass sheet, to which back side the plano-convex lens is adhered, is washed by 1–2% stannous chloride and distilled water. Thereafter a mixture containing equal quantities of the following three solutions is poured three times over the glass surface to form the reflective layer:

*Solution A.*—40-60 gr. of silver nitrate is slowly mixed with 110–130 cc. of 20–30% ammonia water, then the mixture is strongly shaken until any deposition disappears. Thereafter the solution is diluted by 2 l. of distilled water.

*Solution B.*—35–50 gr. of caustic potash and a small amount of ammonia water is dissolved into 90–110 cc. of distilled water, then the solution is diluted by 2 l. of distilled water.

*Solution C.*—15–25 gr. of glucose is dissolved by 90–110 cc. of hot water, then the solution is diluted by 2 l. of distilled water.

In case the vacuum evaporation of aluminum is utilized, a vacuum evaporation tank is used in which a tungsten filament is arranged against the glass surface to be treated. An aluminum wire of 99.99% purity is mounted on the filament. Thereafter the tank is evacuated up to a high vacuum of between $10^{-3}$ and $10^{-5}$ mm. Hg, and electric current is applied to the filament, whereby the aluminum wire is evaporated and coats the glass surface to form a reflective layer.

On the thus formed reflective layer, a protecting coating of silicone resin, fluoro carbon resin, or any other metal protecting coating may be applied.

In the mirror of this invention the flat mirror portion 1 reflects an image similar to any ordinary mirror. In the portion to which the plano-convex lens 2 is adhered, a magnified image on the concave mirror formed by the reflective layer is further magnified by the plano-convex lens. The magnifying power will almost reach $1+50n/r$ (wherein $n$ represents the index of refraction of glass) viewing from a distance of 25 cm. (distance of distinct vision), whereas that of the image reflected by a simple concave mirror is only $1+50/r$.

What I claim is:

A mirror for simultaneously obtaining an ordinary reflected image and a magnified image in a part of the mirror, said mirror comprising a flat glass plate with opposite flat surfaces, a transparent plano-convex lens, the plano surface of which is adherently secured to one of said flat surfaces of the plate, said plano-convex lens having a substantially smaller extent than said plate, and a layer of reflective material applied to and extending over the exposed portion of said one surface of the plate and the plano-convex lens which is secured thereto to thereby form a plane mirror with a concave mirror in part therein, said lens having a convex surface with a radius of curvature between 50 and 100 cm., such that the concave mirror in combination with the glass plate portion covering the same cooperate to form an erect enlarged image.

References Cited by the Examiner

UNITED STATES PATENTS

| | | | |
|---|---|---|---|
| 1,114,559 | 10/1914 | Weed | 88—87 |
| 1,706,218 | 3/1929 | Chretien | 88—82 |
| 1,725,766 | 8/1929 | Reeves | 88—82 |
| 1,771,061 | 7/1930 | Rice | 88—93 |
| 1,869,456 | 8/1932 | Bausch. | |
| 1,898,791 | 2/1933 | Schlumbohm | 88—105 |
| 1,972,019 | 8/1934 | Kanolt | 88—105 X |
| 2,489,506 | 11/1949 | Seutin | 88—84 |
| 2,780,960 | 2/1957 | Miller. | |
| 2,909,204 | 10/1959 | Somerville | 88—73 X |
| 2,934,454 | 4/1960 | Heard | 117—35 |

FOREIGN PATENTS

| | | |
|---|---|---|
| 830,389 | 5/1938 | France. |
| 82,671 | 8/1895 | Germany. |
| 827,336 | 2/1960 | Great Britain. |

JEWELL H. PEDERSEN, *Primary Examiner.*

D. J. HOFFMANN, T. L. HUDSON,
*Assistant Examiners.*